June 4, 1929.  J. BRANDSTETTER  1,715,637
REVERSING GEARING FOR TAPPING MACHINES
Original Filed May 21, 1925
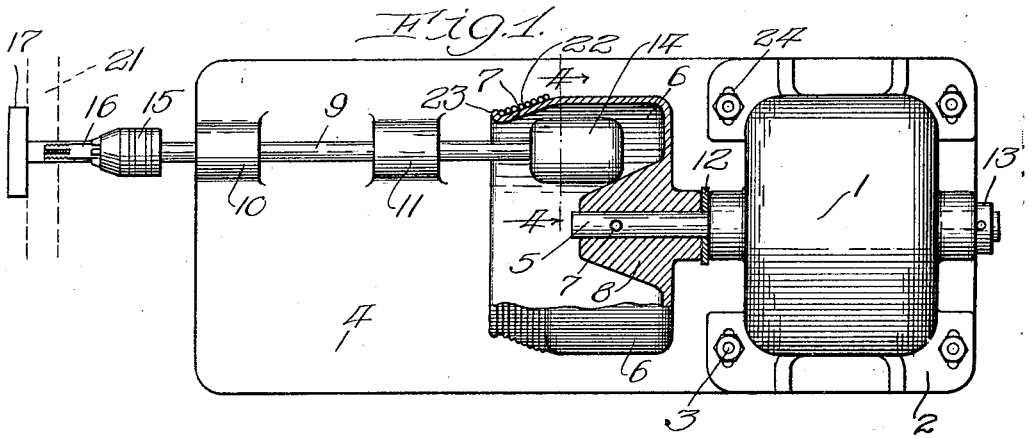
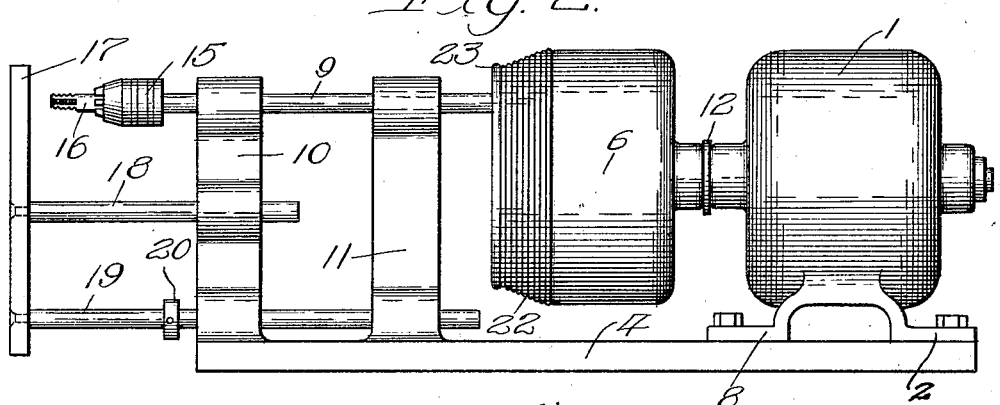
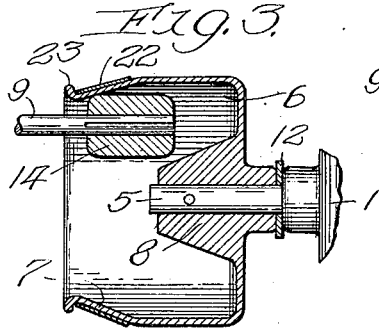
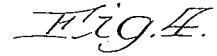
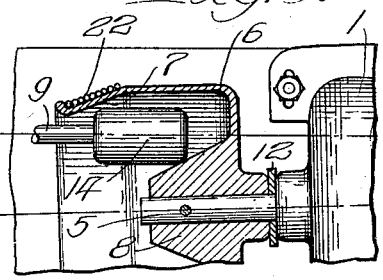
Inventor:
Josef Brandstetter
by Albert Scheith
Attorney Patented June 4, 1929.

1,715,637

UNITED STATES PATENT OFFICE.

JOSEF BRANDSTETTER, OF CHICAGO, ILLINOIS.

REVERSING GEARING FOR TAPPING MACHINES.

Refile of abandoned application Serial No. 31,773, filed May 21, 1925. This application filed May 19, 1927.
Serial No. 192,753.

This application is a refile of abandoned application No. 31,773, filed by me on May 21, 1925, and relates to machines for tapping threads in previously bored holes. Generally speaking, it is the object of my invention to provide an exceedingly simple and easily operating tapping machine in which the use of belts or reversing gears is entirely avoided, and one which will be particularly adapted for a direct electric driving.

In some of its more detailed objects, my invention aims to provide a tapping machine in which a single friction head on the tap-carrying shaft is adapted to engage two friction surfaces formed on a single and continuously rotating driven member, in which the the unscrewing of the tap is effected more rapidly than the threading action of the tap, in which the change in direction is automatically effected through a longitudinal sliding of the tap-carrying shaft by the movement of the object which is being tapped, and in which the position of the tap-carrying shaft with respect to the shaft of the driving member can readily be adjusted to compensate for wear on the friction head on the tap-carrying shaft.

My invention also provides a machine of this type in which an exceedingly light, simple and inexpensive friction member is employed for the driving, and in which this friction member can readily be attached directly to the shaft of a standard type of electric motor. It also provides simple and effective means for silencing the machine when the tap-carrying shaft is being reversed in rotation. Still further and also more detailed objects will appear from the following specification and from the accompanying drawings in which Fig. 1 is a plan view of a motor-driven tapping machine embodying my invention, with a portion of the driving friction member broken away to show the position of the friction head on the tap-carrying shaft during the tapping operation.

Fig. 2 is a side elevation of the same machine.

Fig. 3 is a fragmentary horizontal section taken along the axis of the driving or motor shaft and showing the friction head on the tap-carrying shaft as disposed for rotating in a reversed direction so as to unscrew the tap.

Fig. 4 is an enlarged transverse section taken through this friction head along the line 4—4 of Fig. 1.

Fig. 5 is a fragmentary section, similar to a portion of Fig. 1 but showing the effect of twisting the motor on the supporting base of the machine.

In the illustrated embodiment, I am showing an electric motor 1 having its base lugs 2 fastened by bolts 3 to the base plate 4 of the machine. The shaft 5 of the motor projects at one end beyond the frame of the motor and carries a substantially cup-shaped friction member 6 which is fastened to the shaft by a pin 7. This friction member has a central boss projecting from the bottom (or rear) of the cup-shaped formation forward toward the mouth of the latter, this boss 8 having its outer face of a forward tapering frusto-conical form. The lateral wall of the cup-shaped friction member 6 has its forward portion 7 also tapered forwardly or towards the mouth of the cup, so as to provide an inner frusto-conical face which desirably has the same taper as the boss 8 at the center of the friction member, but which is further forward than this cup.

Extending into the annular space between these two frusto-conical surfaces is a tap-carrying shaft 9 which desirably extends approximately parallel to the motor driven shaft 5. The shaft 9 is journaled in a pair of risers 10 and 11 carried by the base 4 and is free to move longitudinally in its said journals, while the motor shaft is prevented from longitudinal movement by a pair of washers 12 and 13 respectively engaging the outer faces of the bearings for the motor shaft.

Fastened to the rear end of the tap-carrying shaft 9 is a friction member 14, which is here shown as a cylinder slightly rounded at both ends. This friction member is preferably made of a different material from the cup-shaped friction member 6, as for example by making the latter of aluminum and making the friction head 14 of leather. As a simple means for anchoring the friction member 14 on the shaft 9, Figs. 3 and 4 show this shaft as having a series of longitudinal grooves into which portions of the previously bored leather head 14 will be forced when this member is pressed upon the shaft.

At its forward end the shaft 9 carries a chuck 15 for holding a tap 16 in the usual manner. To resist the forward thrust of the tap during its tapping operation, I provide a suitable thrust member, here shown as a presser plate 17 carried by a pair of horizontal stems 18 and 19, both of which extend slidably through the forward riser 10. The lower guide stem 19 also extends slidably through the other riser 11 and has a stop collar 20 fastened to it, this collar being adapted to engage the front of the riser 10 so as to limit the rearward sliding of the thrust member which comprises the parts 17, 18 and 19.

With the motor continuously rotating and with the presser plate 17 forcing a previously drilled object (such as the plate shown in dotted lines in Fig. 1 as 21) rearwardly of the machine against the tap, the resulting pressure slides the shaft 9 rearwardly and forces the friction head 14 against the tapering central boss 8 of the friction member, thereby causing the tap-carrying shaft to be rotated in one direction. As soon as the tap has cut its thread through the workpiece 21, the latter is drawn forwardly, thereby causing the tap to pull the shaft 9 forwardly so as to bring the friction head 14 into engagement with the tapering mouth portion 7 of the friction member. Since the friction head is then frictionally engaged on the diametrically opposite side from its previous engagement as shown in Fig. 1, the direction of rotation is reversed, and since the diameter of the tapering cup wall portion 7 is considerably greater than that of the tapering boss 8, the speed of rotation in this reverse direction is correspondingly increased, although the motor shaft is continually driven at a constant speed. Consequently, I secure an entirely automatic reversing and a retraction of the shaft at a speed considerably greater than the tapping speed, and I accomplish this without employing either the gearing or the multiplicity of belts and pulleys heretofore used for such purposes.

In practice, the cup-shaped friction member can readily be made of a simple casting of iron, aluminum or the like. However, the cup shape employed for this casting will cause it to act like a bell so as to emit a ringing tone when the friction head is suddenly drawn forward gainst its tapering mouth end. To overcome this ringing action, I desirably provide suitable means for dampening vibrations in this casting and particularly for dampening the mouth portion of the cup. For this purpose, Fig. 1 shows the outer surface of the tapering mouth portion 7 as surrounded by a wrapping of twine 22 which can readily be cemented in place, the extreme mouth end 23 of this part of the friction member being desirably flared outwardly so as to afford a stop for preventing the twine from slipping off when it is being wound in place. Fig. 3 shows a similar shaping of the mouth portion of the friction member 6, but shows this as wrapped with a layer of friction tape 23, which I have also found suitable for the same purpose.

With the frictionally engaged parts arranged as above described, I have found that the wear on the leather friction head 14 is quite gradual, as a relatively light pressure is sufficient for affording an adequate friction grip between this head and the portions 7 and 8 of the friction member. However, I desirably provide means also whereby the relative positions of the two shafts 5 and 9 can readily be adjusted, thereby permitting a prolonged use of the friction head even when this has worn down below the size at which it will readily engage the two tapering surfaces of the friction member. For this purpose, I simply elongate the perforations 24 in the base lugs 2 of the motor transversely of the motor shaft as shown in Fig. 1, so as to permit the motor to be twisted on the base 4 of the machine, the bolts 3 being temporarily loosened for this purpose. By doing this, I can swing the axis of the shaft 5 at a slight angle in either direction with respect to the axis of the tap-carrying shaft 9, as shown for one direction in Fig. 5, thereby varying the effective width of the annular space in which the friction head 14 is disposed. This shiftable mounting also allows me to make the friction head somewhat longer at the start, as the wear on it comes at its ends, as the motor can be twisted in one direction at the start and adjusted in position when the friction head has worn considerably, thus considerably prolonging the life of the leather head.

When the friction head 14 is made of a somewhat yielding and distortible material, such as leather, I permit this to be distorted somewhat when pressed against either of the two tapering driving surfaces, and particularly so when the friction head is in the form of a cylinder which has a relatively long medial portion between the frictionally engaged end portions. This distortion permits the friction head to engage either of the tapering driving surfaces for a much greater length than could be done with a metal friction head without unduly heating and wearing the latter.

Moreover, I preferably make cup-shaped driving member 6 of such a longitudinal size that it projects considerably beyond the outer end of the friction head at all times, as shown in the drawings. Thus arranged, the said cup-shaped member completely houses and guards the friction member and a prevents the clothing of the man operating my tapping machine from being caught between the driving parts of the machine. By disposing the tap-shaft journaling riser adjacent to the mouth of the cup-shaped driving member, I enable this to act also as a guard, so that my simple tapping machine is an unusually safe one for operation even by careless boys.

However, while I have illustrated and described my tapping machine in an embodiment in which the driving shaft 5 is also the shaft of the actuating motor, I do not wish to be limited to a direct drive combination, as my friction drive arrangement obviously would work equally well regardless of the means employed for rotating the cup-shaped driving member. Neither do I wish to be limited to the various details of construction and arrangement here disclosed, as many changes might obviously be made without departing either from the spirit of my invention or from the appended claims.

I claim as my invention:

1. In a tapping machine, a substantially cup-shaped driving member having its lateral wall tapered toward the mouth thereof, a tap-carrying shaft extending into the cup, a friction member fast on the shaft and housed by the said member and disposed for engaging the said wall when the shaft is moved longitudinally away from the bottom of the cup, and sound deadening means associated with the said wall.

2. In a tapping machine, a substantially cup-shaped driving member having its lateral wall tapered toward the mouth thereof, a tap-carrying shaft extending into the cup, a friction member fast on the shaft and housed by the said member and disposed for engaging the said wall when the shaft is moved longitudinally away from the bottom of the cup, and a wrapping of sound deadening material surrounding the outer face of the said tapered wall.

3. In a tapping machine, a substantially cup-shaped driving member having its lateral wall tapered toward the mouth thereof and having a forwardly tapering boss projecting forwardly from its cup bottom, a tap-carrying shaft extending into the cup, a friction member fast on the shaft and entirely housed by the said member and having its end portions respectively disposed for engaging the said wall and the periphery of the said boss according as the shaft is moved longitudinally away from or toward the bottom of the cup, and supporting means for the shaft including a member disposed close to the mouth of the cup and cooperating with the housing of the friction member by the driving member to prevent clothing of the user from being caught between the said two members.

Signed at Chicago, Illinois, May 18th, 1927.

JOSEF BRANDSTETTER.